(12) United States Patent
Hudson

(10) Patent No.: US 8,534,229 B2
(45) Date of Patent: Sep. 17, 2013

(54) PUMP-ASSISTED GRAVEL VACUUM

(75) Inventor: Andrew S Hudson, Oak Creek, WI (US)

(73) Assignee: Central Garden and Pet Company, Walnut Creek, CA (US)

( * ) Notice: Subject to any disclaimer, the term of this patent is extended or adjusted under 35 U.S.C. 154(b) by 205 days.

(21) Appl. No.: 13/150,697

(22) Filed: Jun. 1, 2011

(65) Prior Publication Data

US 2011/0290192 A1    Dec. 1, 2011

Related U.S. Application Data

(60) Provisional application No. 61/350,115, filed on Jun. 1, 2010.

(51) Int. Cl.
*A01K 63/04*     (2006.01)

(52) U.S. Cl.
USPC ........................ 119/264; 210/167.21

(58) Field of Classification Search
USPC ............ 119/264, 263, 259, 269; 210/167.21, 210/167.23, 167.26
See application file for complete search history.

(56) References Cited

U.S. PATENT DOCUMENTS

| | | | | |
|---|---|---|---|---|
| 2,899,063 A | * | 8/1959 | Ellis, Jr. | 210/167.21 |
| 3,225,930 A | * | 12/1965 | Willinger | 210/241 |
| 3,734,853 A | * | 5/1973 | Horvath | 210/167.25 |
| 4,645,593 A | * | 2/1987 | Dunk et al. | 210/167.27 |
| 4,722,670 A | * | 2/1988 | Zweifel | 417/181 |
| 5,401,401 A | * | 3/1995 | Hickok et al. | 210/167.27 |
| 5,695,654 A | | 12/1997 | Schultz | |
| 5,975,022 A | * | 11/1999 | Miller | 119/264 |
| 6,058,884 A | | 5/2000 | Rawls | |
| 6,080,304 A | * | 6/2000 | Gomi | 210/94 |
| 6,202,677 B1 | * | 3/2001 | Chen et al. | 137/428 |
| 6,269,773 B1 | | 8/2001 | Rawls | |
| 6,732,675 B1 | * | 5/2004 | Liao | 119/259 |
| 6,857,392 B1 | * | 2/2005 | Shyu | 119/263 |
| 7,214,314 B2 | | 5/2007 | Reyniers | |
| 7,294,257 B2 | * | 11/2007 | Jackson | 210/167.21 |
| 8,267,047 B2 | * | 9/2012 | Tunze | 119/247 |
| 8,268,179 B2 | * | 9/2012 | Peters | 210/767 |

* cited by examiner

*Primary Examiner* — Yvonne Abbott
(74) *Attorney, Agent, or Firm* — Andrus, Sceales, Starke & Sawall, LLP

(57) ABSTRACT

A vacuum device for an aquarium is disclosed. The device comprising a tube having a pump contained therein. The pump utilizes a ring-shaped rotor with interior vanes for impelling water through the device.

25 Claims, 3 Drawing Sheets

PUMP-ASSISTED GRAVEL VACUUM

CROSS-REFERENCE TO RELATED APPLICATIONS

The present application claims the benefit under 35 U.S.C. §119(e) to U.S. Provisional Application No. 61/350,115, filed on Jun. 1, 2010, the content of which is incorporated herein by reference in its entirety.

BACKGROUND

The field of the invention relates to vacuums for aquariums. In particular,- the field relates to pump-assisted vacuums for aquariums.

Apparatuses for draining and cleaning aquariums are known in the art. For example, such apparatuses are described in U.S. Pat. Nos. 7,214,314; 6,269,773; 6,058,884, and 5,695,654, the contents of which are incorporated herein by reference in their entireties.

In the normal course of maintaining an aquarium, it becomes necessary to change the water in order to remove and dilute various types of dissolved pollutants as well as particulates that have collected in the aquarium gravel. Typically, the water is siphoned out of the aquarium using a flexible hose. The water can be siphoned out using the force of gravity or may be drawn out through the use of a venturi siphon assist connected to a household water faucet. These types of gravity systems have several disadvantages. First, they require a reservoir such as a bucket in order to collect the waste water from the aquarium. Gravity systems also require that the siphon be primed by removing the air out of the hose or by pumping a squeeze bulb to start the siphon. Gravity systems also do not function well when the water level in the aquarium approaches the level of the reservoir and the effect of gravity is reduced. Venturi siphon assists also are disadvantageous in that they require the use of a high flow of water to start the siphon and maintain it. The water utilized in a venturi siphon assist system is not recovered and is wasted down the drain. Typically, venturi siphon assist systems waste about 6-14 gallons of tap water for every gallon they drain from the aquarium.

As an alternative to siphon systems, water can be pumped directly out of an aquarium. However, the pump impeller must be protected by a screen in order to prevent debris from entering the pump, clogging, damaging, or otherwise preventing the impeller from functioning. These screens do not permit debris to be siphoned out of the aquarium and result in frequent time consuming delays as the siphon must be stopped periodically and the screen cleaned of debris.

SUMMARY

Disclosed are vacuum devices for an aquarium. The devices may be utilized for vacuuming and cleaning aquarium gravel.

The devices typically include a tube having an inlet for receiving water and an outlet for discharging water and a pump contained in the tube. The pump typically includes a power source, a stator connected to the power source, and a rotor that rotates in the stator. The rotor typically is ring-shaped and includes interior vanes or blades such that as the'rotor rotates in the stator, water is impelled through the device.

The inlet and the outlet of the tube may be different in size. In some embodiments, the inlet has a diameter that is greater in size than the diameter of the outlet. For example, the diameter of the inlet may be at least 2×, 3×, 4×, 5×, 10×, or 20× greater than the diameter of the outlet.

The device may include tubing attached to the outlet. For example, the device may include flexible tubing attached to the outlet, which tubing may be attached at its distal end to a siphon device (e.g., a venturi siphon assist). Alternatively, the distal end of the tubing may be placed in a container for water that is removed from an aquarium via the device.

In some embodiments, the device further comprises a cover for the rotor that holds the rotor in place during operation. This cover may otherwise be referred to as an impeller well cover.

The interior vanes of the rotor are configured to impel water through the pump from the inlet direction to the outlet direction as the rotor rotates in the stator and may be any suitable geometric shape. Preferably, the interior vanes are triangular-shaped blades. The rotor typically includes three or more interior vanes and preferably 3-6 interior vanes.

The rotor is configured to rotate within the stator of the pump. Typically, the rotor and stator comprise magnets configured for driving rotation of the rotor within the stator when the power source is activated. Suitable power sources may include an AC power source, a DC power source, or a battery power source. Devices that include a battery may further include a watertight case for the battery and may include a printed circuit board and a capacitor (e.g., in order to generate a charge buildup from the battery).

The device preferably includes a switch for activating the power source. The switch preferably is located on the outside of the tube and may be depressible. For example, the power to the stator may be provided when the switch is depressed. Optionally, the device includes a indicator for indicating that power is being provided to the device. In some embodiments, the device includes a light that is illuminated when the switch is turned on. For example, the device may include a light emitting diode that is turned on when the switch is turned on. Optionally, the device includes a second switch for controlling speed of rotation of the rotor. For example, the device may include a dial type switch for controlling speed of rotation of the rotor.

DETAILED DESCRIPTION

Disclosed are vacuum devices for aquariums. In particular, pump-assisted gravel vacuum devices are disclosed.

Figure 1:
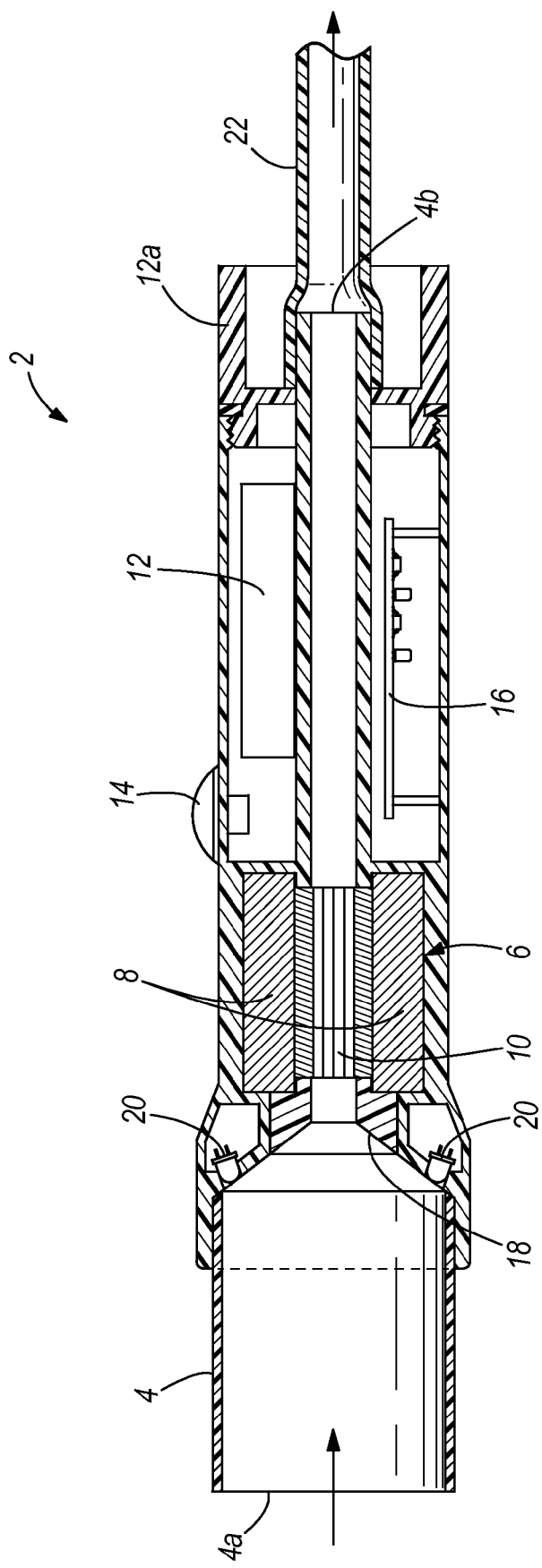
FIG. 1 provides a. lateral cross-sectional view of one embodiment of the device as contemplated herein.

Referring now to FIG. 1, shown is a lateral cross-sectional view of one embodiment of the device 2 as contemplated herein. The device includes a tube 4, which may function as a handle for the device and/or a housing for the pump 6. The inlet end of the device 4a includes a relatively large diameter opening as compared to the diameter opening for the outlet end 4b. The inlet end 4a may be utilized for vacuuming debris out of the gravel of an aquarium and serves as a water inlet. The outlet end 4b serves as a water outlet. The device optionally is connected to flexible tubing 22 via the outlet end 4b. The distal end of the flexible tubing may be attached to a sink via a. siphon device such as a venturi siphon assist-or maybe placed in a reservoir to collect water drained from the aquarium via the device.

Figure 2:
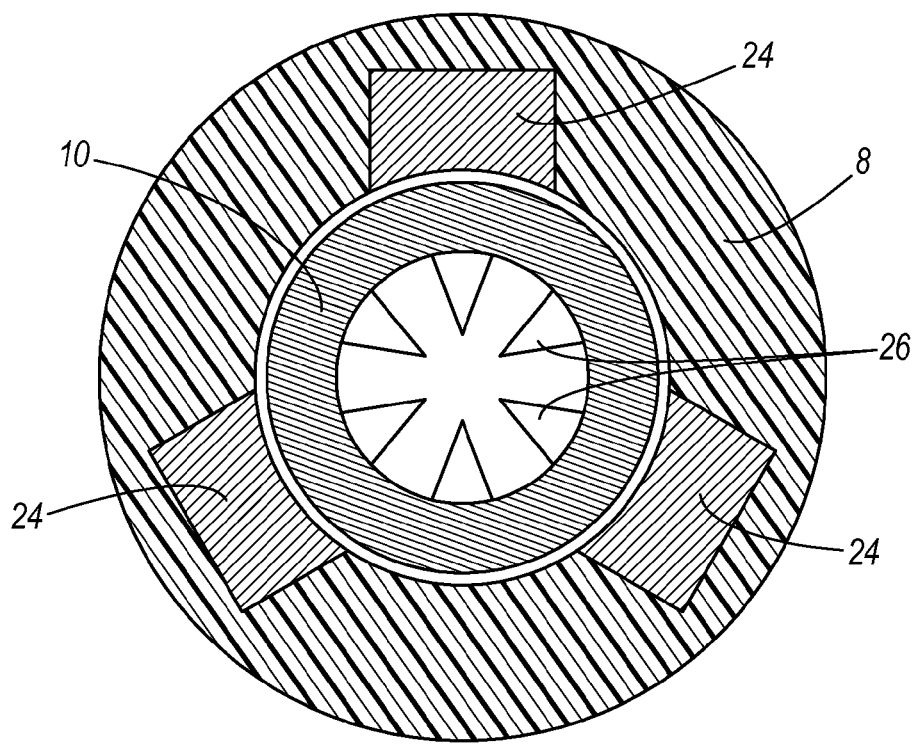
FIG. 2 provides a traverse cross-sectional view of one embodiment of the stator and rotor as contemplated herein.
Figure 3:
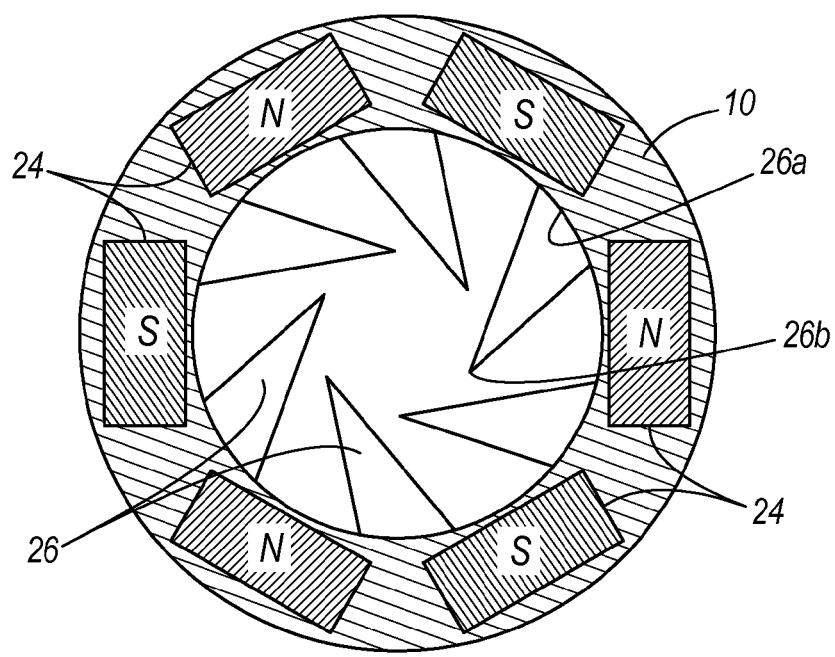
FIG. 3 provides a traverse cross-sectional view of one embodiment of the rotor as contemplated herein.

The pump 6 includes a rotor 10 that is shaped as a circular ring (FIGS. 2 and 3) and rotates within the stator 8: Drive magnets for the rotor 24 may be imbedded in the stator and the rotor (FIGS. 2 and 3).

Figure 4A:
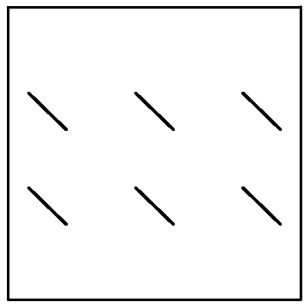
FIG. 4 provides schematic representations of configurations of rotors and interior vanes as contemplated herein.
Figure 4B:
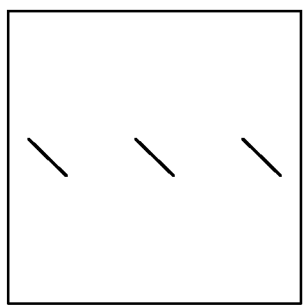
Figure 4C:
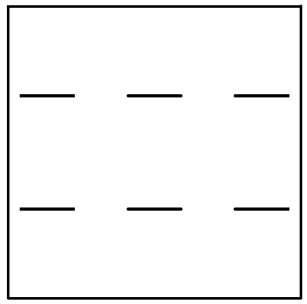
Figure 4D:
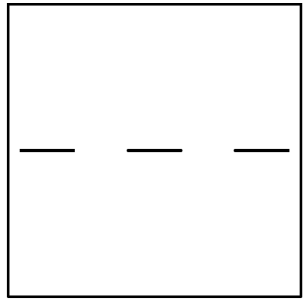
Figure 4E:
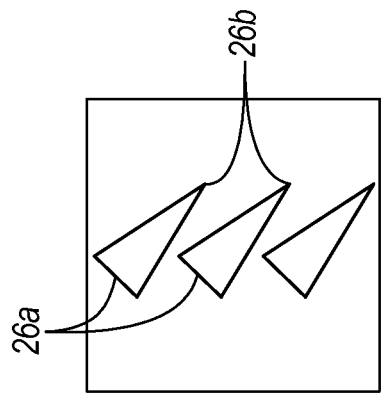
Figure 4F:
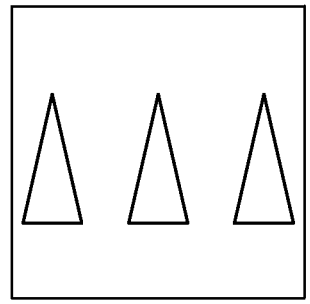

The rotor 10 includes interior vanes or blades 26 that optionally are angled and swept back in the direction of the water flow path through the device (FIG. 4F). The center of the rotor 24 is open and permits debris to travel through the center of the rotor together with impelled water (FIGS. 2 and 3).

The interior vanes of the rotor are configured to impel water through the pump from the inlet direction to the outlet direction as the rotor rotates in the stator. The vanes include a base 26a by which the vanes are attached to the interior of the rotor and an end 26b opposite the base protruding into the axial center of the rotor (FIGS. 3 and 4F). The vanes may be attached via their bases to the interior of the rotor and further the ends of the vanes opposite of their bases may be angled toward the outlet in the direction of water flow through the pump (FIGS. 4E and F). As such, the vanes are swept back such that any debris that contacts a vane is pushed downstream along the vane until it clears the vane. In some embodiments, the interior vanes 26 may be attached to the interior of the rotor and may form a single ring of vanes (FIGS. 4A, C, E, and F). Alternatively, the interior vanes 26 may be attached to the interior of the rotor and may form two or more rings of vanes (FIGS. 4B and D). In some embodiments, the interior vanes 26 may be attached to the interior of the rotor in a plane traverse to the direction of water flow through the pump 28 (FIGS. 4A, B, E) or preferably the interior vanes 26 may be attached at an angle with respect to a plane traverse to the direction of water flow through the pump (FIGS. 4C, D, F).

The device of FIG. 1 further includes an impeller well cover 18.; which optionally is removable. This cover is preferably a ring that holds the rotor 10 in place within the stator 12 during operation of the pump 6. Water passes through the cover 18 unimpeded. Preferably, the cover 18 can be removed while die pump is not in operation in order to clean the rotor 10.

The vacuum devices disclosed herein include a power source. Shown in FIG. 1 is a device having a battery power source 12 and a watertight battery cover 12a. The battery is utilized to create a charge via a printed circuit board and capacitor 16. The device in FIG. 1 includes a switch 14 on the outside of the tube 4. When the switch is depressed, the charge is released, power is applied to the stator-8, and the rotor 10 rotates within the stator. The device shown in FIG. 1 also includes a pair of light emitting diodes (LEDs) 20. The LEDs illuminate to indicate when the device is actively powered. Utilized as such, the vacuum device creates short bursts of water flow which can be used to initiate siphoning in conjunction with a siphon device attached to the vacuum device.

In some embodiments, the vacuum devices disclosed herein may be utilized to accelerate water otherwise flowing through a siphon via gravity. In other embodiments, the vacuum devices disclosed herein may be utilized to prime a siphon, remove debris that is too large to be removed via a gravity siphon alone, and/or increase the flow of water where the force of gravity for a gravity siphon is weak. In a preferred embodiment, the vacuum devices disclosed herein are utilized in conjunction with a venturi,siphon assist. The vacuum device, may be connected to a venturi siphon assist via flexible tubing at the outlet end of the device. Utilized as such, the venturi siphon assist first may be employed with a water tap to start a siphon by turning the water tap on. Subsequently, the water tap may be turned off and the vacuum device may be employed to push water from the aquarium to the drain in order to reduce the amount of tap water wasted during siphoning.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems and method steps described herein may be used alone or in combination with other configurations, systems and method steps. It is to be expected that various equivalents, alternatives and modifications are possible.

The invention claimed is:

1. A vacuum device for an aquarium, the device comprising:
   (a) a tube having, an inlet for receiving water and an outlet for discharging water; and
   (b) a pump contained in the tube, the pump comprising:
      (i) a power source;
      (ii) a stator connected to the power source; and
      (iii) a ring-shaped rotor that rotates in the stator and comprises triangular-shaped interior vanes, wherein as the rotor rotates in the stator water is impelled through the device.

2. The device of claim 1, wherein the inlet and outlet have respective diameters and the diameter for the inlet is greater in size than the diameter for the outlet.

3. The device of claim 1, further comprising tubing attached to the outlet.

4. The device of claim 1, further comprising a removable cover that holds the rotor in place.

5. The device of claim 1, wherein the interior vanes are angled toward the outlet.

6. The device of claim 1, wherein the power source is an AC power source.

7. The device of claim 1, Wherein the power source is a DC power source.

8. The device of claim 1, wherein the power source is a battery and the device further comprises a watertight battery case for the battery.

9. The device of claim 8, further comprising a capacitor.

10. The device of claim 8, further comprising a printed circuit board.

11. The device of claim 1, further comprising a switch on the outside of the tube fur activating the power source.

12. The device of claim 11, wherein the switch is depressible and the pump is activated when the switch is depressed.

13. The device of claim 11, further comprising a light that is illuminated when the switch is turned on.

14. The device of claim 13, wherein the light is a light emitting diode.

15. The device of claim 11, further comprising a second switch for controlling speed of rotation of the rotor.

16. The device of claim 1, further comprising a venturi siphon assist attached to the outlet.

17. A method for removing water from an aquarium, the method comprising: (a) inserting the inlet of the device of claim 16 into the aquarium; (b) turning on a water tap to create a siphon via the venturi siphon assist; (c) turning off the water tap and (d) turning the power source of the device on.

18. A method for removing water from an aquarium, the method comprising, inserting the inlet of the device of claim 1 into the aquarium and turning the power source on.

19. A vacuum device for an aquarium, the device comprising
(a) a tube having an inlet for receiving water and an outlet for discharging water; and
(b) a pump contained in the tube, the pump comprising:
(i) a power source, wherein the power source is a battery and the device further comprises a watertight battery case for the battery and a capacitor;
(ii) a stator connected to the power source; and
(iii) a ring-shaped rotor that rotates in the stator and comprises interior vanes, wherein as the rotor rotates in the stator water is impelled through the device.

20. The device of claim 19, further comprising a printed circuit board.

21. A vacuum device for an aquarium, the device comprising:
(a) a tube having an inlet for receiving water and an outlet for discharging water; and
(b) a pump contained in the tube, the pump comprising:
(i) a power source;
(ii) a stator connected to the power source; and
(iii) a ring-shaped rotor that rotates in the stator and comprises interior vanes, wherein as the rotor rotates in the stator water is impelled through the device; and
(c) a switch on the outside of the tube for activating the power source and a second switch for controlling speed of rotation of the rotor.

22. The device of claim 21, wherein the switch is depressible and the pump is activated when the switch is depressed.

23. The device of claim 21, further comprising a light that is illuminated when the switch is turned on.

24. The device of claim 23, wherein the light is a light emitting diode.

25. A vacuum device for an aquarium, the device comprising:
(a) a tube having an inlet for receiving water and an outlet for discharging water, and venturi siphon assist attached to the outlet; and
(b) a pump contained in the tube, the pump comprising:
(i) a power source;
(ii) a stator connected to the power source; and
(iii) a ring-shaped rotor that rotates in the stator and comprises interior vanes, wherein as the rotor rotates in the stator water is impelled through the device.

* * * * *